Sept. 24, 1929.  P. ST. CLAIR, JR  1,729,366
COMBUSTION ENGINE
Filed Sept. 12, 1925  3 Sheets-Sheet 1
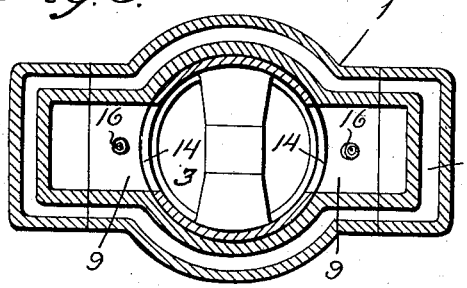
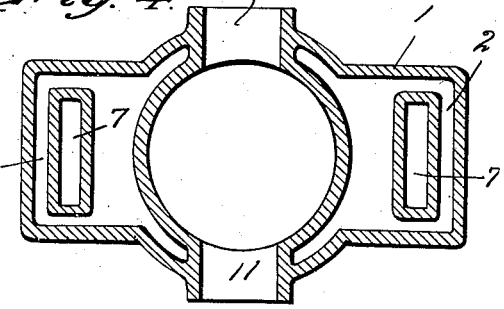
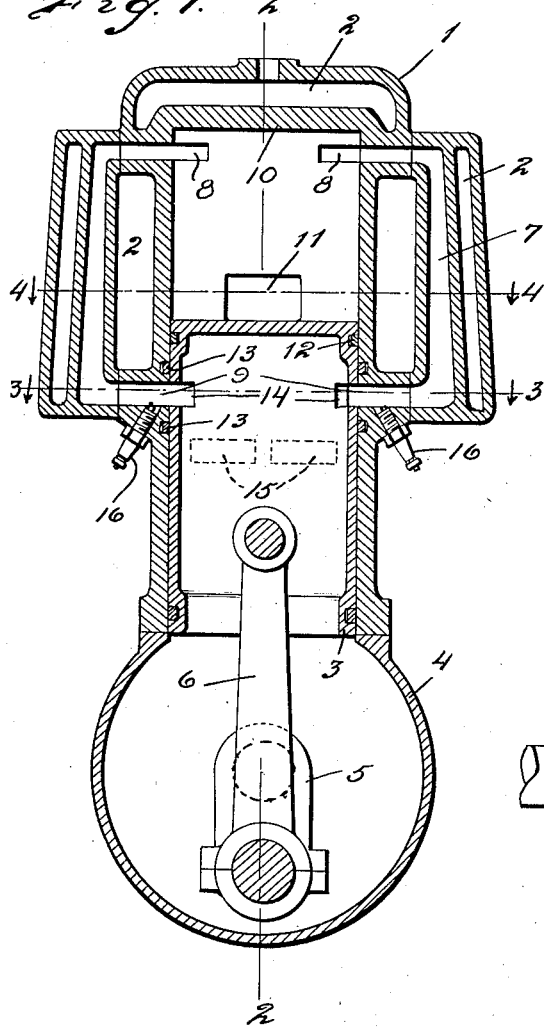
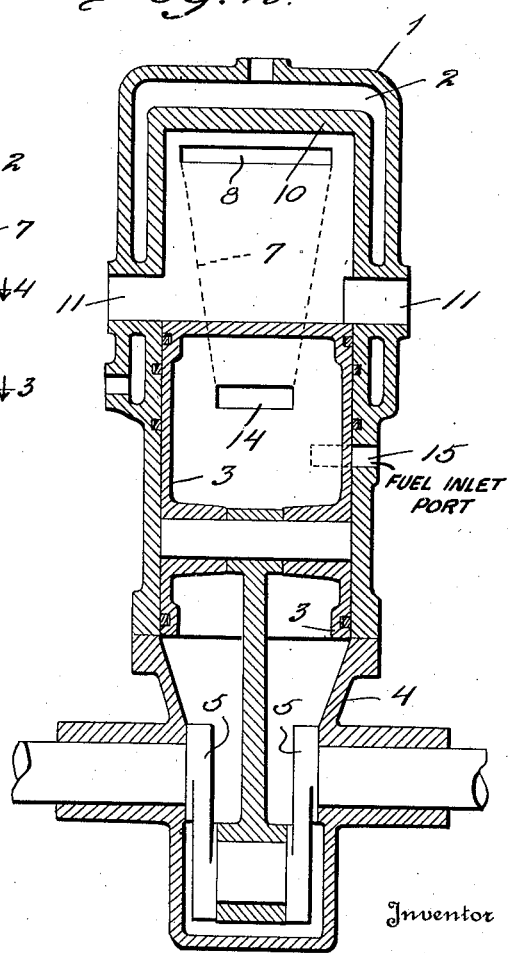

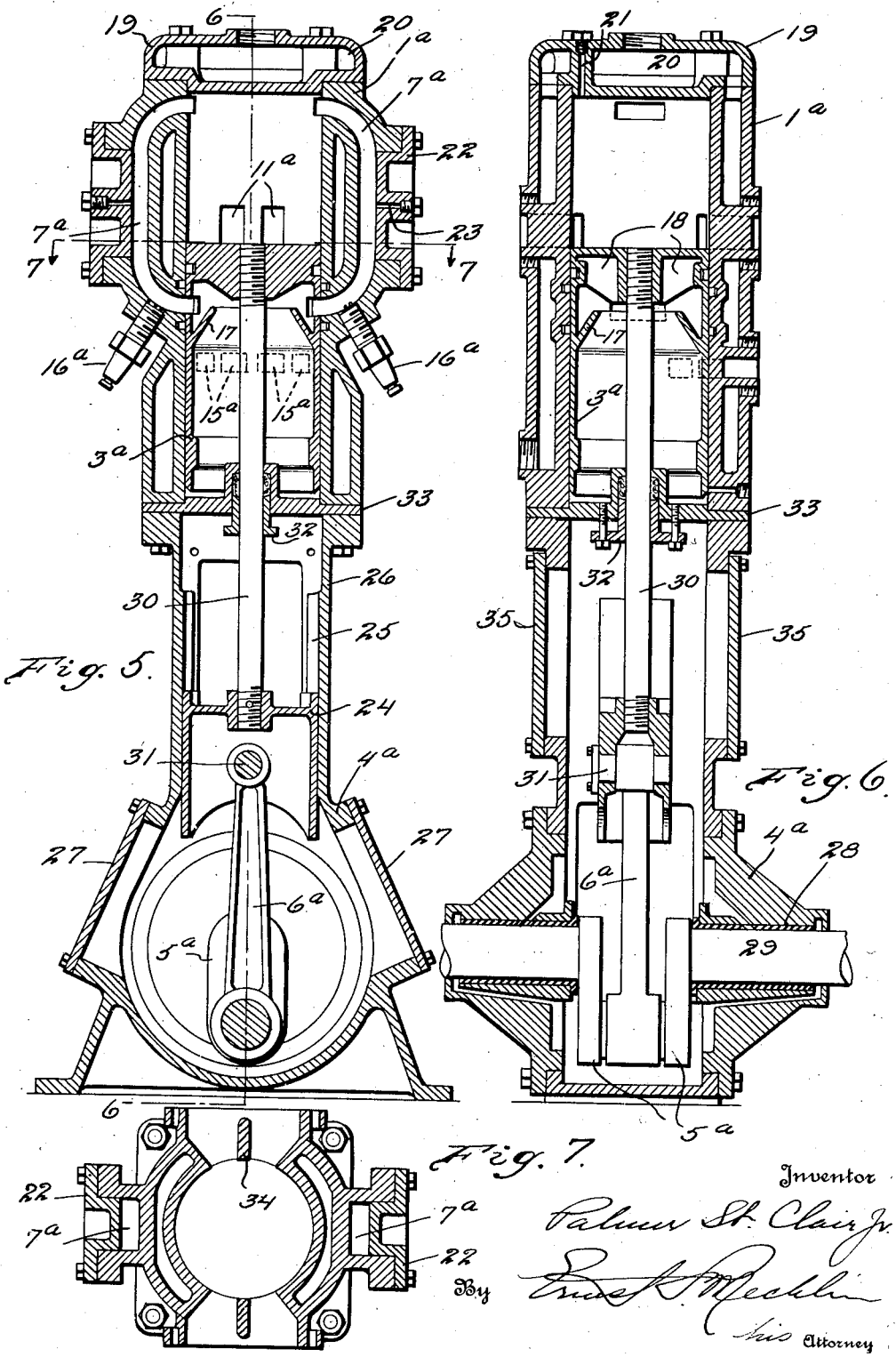

Sept. 24, 1929.  P. ST. CLAIR, JR  1,729,366
COMBUSTION ENGINE
Filed Sept. 12, 1925  3 Sheets-Sheet 3

Inventor
Palmer St. Clair Jr
By
his Attorney

Patented Sept. 24, 1929

1,729,366

UNITED STATES PATENT OFFICE

PALMER ST. CLAIR, JR., OF ROANOKE, VIRGINIA

COMBUSTION ENGINE

Application filed September 12, 1925. Serial No. 55,997.

The present application is a continuation in part of my now abandoned, originally copending application Serial No. 9,993, filed February 18, 1925, on internal combustion engines.

The invention relates to combustion engines and more particularly to a type in which the fuel is consumed in a combustion chamber or chambers separated from the cylinder.

The principal object of my invention, generally considered, is the provision of a combustion engine in which the combustion or explosion is effected outside of the working cylinder and which embodies the two thermodynamic principles of heating at constant volume and heating at constant pressure in the same cycle whereby high efficiency and high capacity are obtained.

An object of my invention is the provision of a combustio engine in which explosive charges are consumed in a combustion chamber or chambers closed off from the working cylinder and connected with said working cylinder after combustion for acting on said piston to effect the operation of the engine.

Another object of my invention is the provision of a combustion engine formed with a plurality of ignition or combustion chambers disposed on opposite sides of the working cylinder and communicating therewith by oppositely disposing ports, said ports being completely closed by means of the piston when the charge is ignited, whereby the formation of carbon on the cylinder walls is eliminated.

A further object if my invention is the provision of a combustion engine of the two-cycle type in which the explosive mixtures are introduced into combustion chambers disposed so as to balance each other on opposite sides of the working cylinder, the piston serving to completely close off the combustion chambers therefrom when the charge is ignited and after ignition to admit the products of combustion from said combustion chambers to the working cylinder in a smooth, gradual and accelerated manner.

A still further object of my invention is the provision of a combustion engine in which the working charge is ignited in a combustion chamber or chambers closed off from the working cylinder and maintained at such a temperature when in normal operation by omitting the usual water cooling means for a portion of the area thereof, whereby the desired degree of preheating of the charge may be secured.

An additional object of my invention is the provision of a combustion engine in which the fuel is consumed in a combustion chamber or chambers entirely separate from the working cylinder during ignition and has a uniflow action with respect to said combustion chamber or chambers, whereby commingling of fresh explosive charges and burnt charges is minimized.

There are other objects and advantages of the invention which will become more apparent from the following detailed description.

Before describing preferred embodiments of my invention in detail, it is thought well to consider the underlying or basic principles involved in the construction of an engine according to my invention.

All engines deriving their power from the consumption of fuel for the generation of heat operate according to one or more of the following cycles:

(1) The constant temperature cycle or that in which fuel is consumed at substantially constant temperature as in internal combustion engines of the Diesel type.

(2) The cycle under which the conventional form of gas engine operates.

(3) The cycle under which the usual form of steam engine operates.

It has been determined that under the fundamental laws of thermodynamics, engines embodying the constant volume principle theoretically have the highest efficiency, while those embodying the sustained pressure principle have the greatest capacity. Up to the present time all engines, as far as I am aware, have operated substantially under either one or the other of the three principles or cycles according to thermodynamic laws, but there appears to have never been an engine which has completely combined the last two mentioned principles or cycles for the purpose of obtaining the high efficiency of the constant volume engine as well as the high capacity of the sustained pressure engine. I have devised an engine which embodies these two principles and thereby not only secure high efficiency and capacity, but other desirable results as will be explained in detail hereinafter.

In accordance with my invention a fresh charge is compressed into a combustion chamber or chambers and said charge is completely closed off from the working cylinder while being ignited or exploded so that combustion or heating occurs in a closed space, the volume of which, of course, remains the same while the pressure and temperature increase to a maximum for complete combustion. Heating at constant volume with maximum efficiency is thus had.

At the end of the constant volume portion of my new and combined thermodynamic cycle, there is trapped or confined in the combustion chamber or chambers gaseous products of combustion at high pressure and temperature. These products are admitted to the cylinder by the piston moving to uncover a port or ports from the combustion chamber or chambers to gradually admit the products of combustion into the working cylinder smoothly, gradually and in an accelerated manner to act on the piston in a manner analogous to steam admitted from a boiler to act on the piston of a steam engine. After complete uncovering of the port or ports, which opening corresponds to the cut-off in the cycle of a steam engine, the gases expand and act on the piston as in steam engines during the expansion portion of the cycle. Thus my engine incorporates in one thermodynamic cycle the basic principles of heating at constant volume with its high efficiency and adding expansible fluid during the power stroke, like in a steam engine, with its high capacity or power.

For a more complete understanding of my invention reference is made to the accompanying drawings illustrating the preferred embodiments thereof, the scope of my invention being defined by the appended claims.

Figure 1 is a longitudinal sectional view through an engine embodying my invention.

Figure 2 is a longitudinal sectional view at right angles to that illustrated in Figure 1 on the line 2—2 thereof.

Figure 3 is a transverse sectional view on the line 3—3 of Figure 1 and looking in the direction of the arrows.

Figure 4 is a transverse sectional view on the line 4—4 of Figure 1 and looking in the direction of the arrows.

Figure 5 is a longitudinal sectional view similar to that illustrated in Figure 1, but illustrating another embodiment of my invention.

Figure 6 is a longitudinal sectional view taken at right angles to that shown in Figure 5 on the line 6—6 thereof.

Figure 7 is a transverse sectional view on the line 7—7 of Figure 5 and looking in the direction of the arrows.

Figure 8:
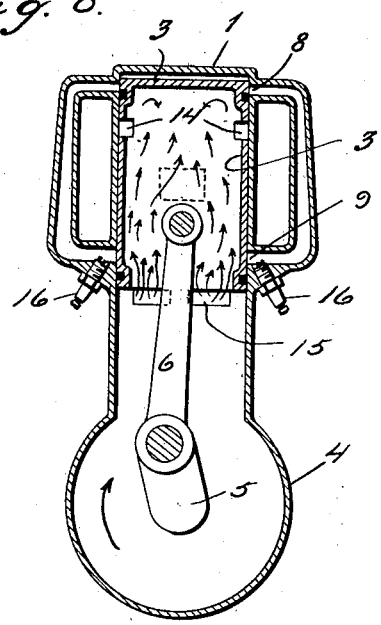
Figures 8, 9, 10 and 11 are diagrammatic illustrations of one embodiment of my invention showing various positions of operation.
Figure 10:
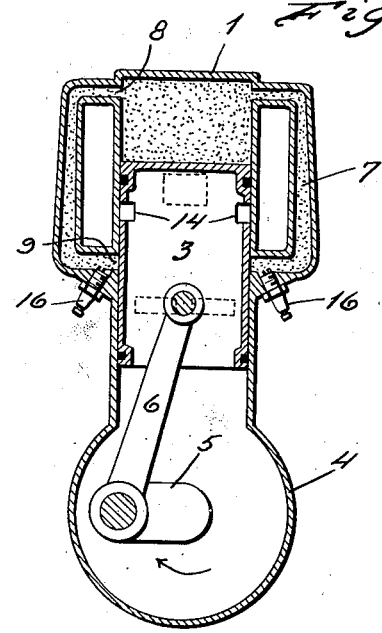

Although in the embodiments of my invention illustrated the same is shown with a single cylinder and of the two-cycle type, it is of course to be understood that the inventive features thereof may be utilized in other embodiments, as, for example, with a plurality of cylinders in any combination with or without crossheads.

Referring to the drawings in detail, particularly Figures 1 to 4 inclusive, a cylinder 1 formed with cooling spaces 2, which may be of ordinary or desired construction, is provided with a piston 3 operating therein. The inner or lower end of the cylinder, in the present embodiment, has connected thereto, in the usual manner, a closed crank case 4 surrounding a crank 5 connected with the piston 3 by a connecting rod 6 in any usual or desired manner. Combustion chambers 7, oppositely disposed, are provided preferably extending lengthwise with respect to the cylinder 1 and communicating with said cylinder by means of outer or upper ports 8 and inner or lower ports 9, which ports are adapted to be completely closed by the piston 3 at the outer end of the stroke and opened when at the inner end of its stroke, as indicated particularly in Figure 1.

Although two oppositely disposed combustion chambers 7 and communicating ports therefor are illustrated, it is obvious that I do not wish to be restricted to such a construction. However, if a plurality of combustion chambers are utilized, as illustrated, it is preferable to have them oppositely disposed or uniformly spaced around the cylinder so that the pressure generated in the combustion chamber or chambers and acting on the piston 3 tends to neutralize that of the other chamber or chambers so that undue wear between the piston and cylinder walls from such pressure is obviated. In the present embodiment the combustion chambers are formed tapering, as illustrated, but of the same approximate cross sectional area. That is, said combustion chambers are wider and narrower at the outer or top ends thereof than at the inner or bottom ends and the ports 8 and 9 are correspondingly formed. That is, said ports 8 are wider and narrower than the ports 9 but such a construction is not essential and in the embodiment subsequently to be described the combustion chambers are of substantially uniform cross sectional areas and the outer and inner ports are similarly formed.

It will be noted that the ports 8 communicate with the cylinder near the outer or upper wall or head 10 thereof, which is preferably imperforate, and the piston 3, when at the outer or upper end of its stroke, approaches the cylinder head 10 very close with only a very small clearance and completely closes the ports 8. Although in the present embodiment the cooling spaces 2 are shown for cooling the head and side walls of the cylinder as well as the outer walls of the combustion chamber 7, I do not wish to be restricted to such a showing as, if desired, a portion of the walls of the combustion chambers, as illustrated particularly in another modification to be described, may be left free from cooling means so as to serve for preheating the charges of combustible gases.

A pair of oppositely disposed exhaust ports 11 are illustrated, but if desired a single or more than two exhaust ports may be employed. These ports are preferably positioned so that the lower edges thereof will be flush or in line with the outer or upper surface of the piston 3 when the same is in its innermost position as clearly illustrated in Figures 1 and 2. The piston is formed with the usual piston rings 12 and the cylinder walls, adjacent the inner ports 9, are also preferably provided with stationary rings 13 for preventing loss of pressure between the piston and cylinder.

A pair of oppositely disposed ports or openings 14 are provided through the piston 3 and are adapted to aline with the ports 9 in the cylinder 1 when the piston is at its extreme inner or lower position, as illustrated in Figures 1 and 2. A pair of preferably elongated openings or ports 15, shown arranged side by side in the present embodiment, are formed in the cylinder 1 connected in any desired manner with the fuel or gas supply through a suitable carburetor (not shown) as well known to those skilled in the art, and are so positioned as to be preferably entirely uncovered when the piston 3 is at the extreme outer or upper end of its stroke. Spark or ignition plugs 16 are provided in the combustion chambers 7 and preferably disposed, as illustrated, near the ports 9 therefrom.

Referring now to the embodiment illustrated in Figures 5, 6 and 7, there is illustrated a modified form of my engine previously described, the main differences being that the piston 3ª is formed with a skirt or conical portion 17 inwardly disposed or underlying the piston head or outer portion thereof and forming a baffle for deflecting the incoming charge of combustible gas against the inner or lower surface of said piston head, which surface is preferably provided with webs or ribs 18 which serve the double function of strengthening the piston head and transferring heat therefrom to the incoming charge of combustible gas.

A cylinder is shown with a removable head 19 provided with a liquid cooling space 20 and a small passage 21 may be formed through said head for the purpose of priming or connecting an indicator thereto. The liquid cooling spaces, in the present instance, surround only the cylinder and the inner surface of the combustion chambers 7ª, the outer surface of said combustion chambers being unprovided with liquid cooling means whereby, when the engine is in operation, said surfaces are maintained at relatively high temperatures and serve as an additional means for preheating the incoming charge and particularly the heavier or unvolatilized portions thereof. In the present instance the combustion chambers 7ª are shown provided with removable heads or covers 22, said heads being preferably formed with apertures 23 therethrough adapted for the application of priming cups, if desired.

The engine of the present modification is shown provided with a crosshead 24 operating in guides 25 in an extension 26 from the crank case 4ª which is of the enclosed type, as shown in the first modification, although not necessarily so as it does not serve for compressing and delivering the incoming charge to the combustion chambers, as in the previous modification. Said crank case is shown provided with removable cover plates 27 and bearings 28 supporting the main engine shaft 29 provided with a crank 5ª connected with the piston rod 30 at the crosshead 24 thereof by a connecting rod 6ª. Said connecting rod is pivoted to the crosshead 24 by means of a wrist pin 31.

For the purpose of preventing loss along the piston rod 30 a stuffing box 32 is provided in the wall 33 separating the crank case from the lower or inner portion of the cylinder 1ª. In the present embodiment the exhaust ports 11ª, on either side of the cylinder, are shown divided by means of webs 34 and four, instead of two, admission ports 15ª are provided. Removable cover plates 35 may also be formed for providing access to the crosshead 24 and associated parts.

Aside from the aforedescribed construction, the second embodiment illustrated in Figures 5, 6 and 7 is or may be substantially the same as the first embodiment, illustrated in Figures 1 to 4 inclusive, and operate substantially the same with the exception that the incoming charge is drawn into and compressed in the inner or lower portion of the cylinder outside of or above the plate 33 instead of in the crank case 4.

Having now described the construction of my combustion engine, the operation thereof will be readily understood by referring to Figures 8 to 11 inclusive, which diagrammatically show four typical operating positions of an embodiment of my invention such as disclosed in connection with Figures 1 to 4 inclusive.

Assuming that the piston 3 is in the position illustrated in Figures 1 and 2, that is at the bottom or extreme inner end of its stroke, the rotation of the crank 5, moving the piston outwardly, closes the ports 9 by moving the openings 14 out of registration with said ports and gradually creates a partial vacuum in the hollow portion of said piston and closed crank case 4. This partial vacuum reaches a maximum when the piston is near the outer or upper end of its stroke, as illustrated diagrammatically in Figure 8, in which position the inlet ports 15 are uncovered and a fresh combustible charge is drawn or sucked in from the external supply through the carbureter or other fuel supply means to the space within the cylinder and closed crank case, previously mentioned. After the crank has passed its outer dead center position the piston starts downwardly and again closes the inlet ports 15 thereby trapping and maintaining the fresh charge in the lower portion of the cylinder and crank case.

Figure 9:
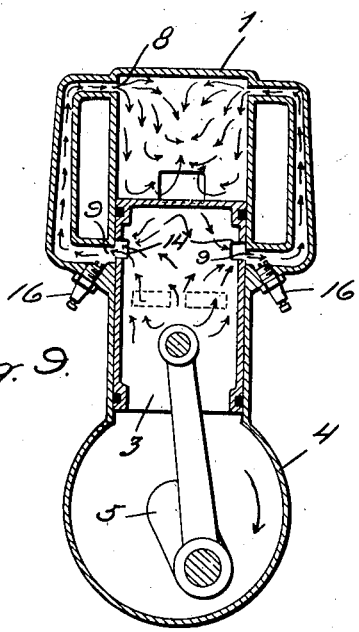

As the piston 3 continues its downward stroke, the fresh charge in this space is continually compressed until the openings 14 in the piston 3 uncover the corresponding ports 9 to the combustion chambers 7, as indicated particularly in Figure 9, and the pressure of this fresh charge will then be sufficient to cause the same to pass through said ports 9 into the combustion chambers 7, driving ahead of it any burnt gases which may be therein. Such fresh charge is not only heated by the piston head or outer wall thereof, especially when a baffle such as shown in Figures 5 and 6 is used, but is heated by passing through the ports 9 and along the combustion chamber 7, thereby effecting a preheating thereof and volatilizing any unvaporized particles therein. The incoming charge not only is heated from the piston but exerts a cooling effect thereon and tends to prevent its overheating. The incoming charge passes through the combustion chamber 7 and into the upper or outer portion of the cylinder 1, driving the residue of the burnt gases ahead of it and out through the exhaust ports 11. The preheating effect on the incoming combustible charge may be increased by omitting the cooling portion 2 along all or a portion of the combustion chamber, as indicated particularly in Figures 5, 6 and 7. As the piston 3 again starts upwardly after the crank has passed its inner dead center position, as shown particularly in Figure 10, the ports 9 as well as the exhaust ports 11 are closed and compression is effected upon said fresh charge in the working cylinder 1 and also in the combustion chamber 7 connected with said cylinder through ports 8 and simultaneously a partial vacuum is created in the closed crank case and space below or inwardly of the piston, as has been previously described.

When the piston 3 reaches its uppermost or extreme outer dead center position the ports 8 are closed, the fresh charge having been compressed almost entirely into the combustion chamber 7 with a small portion in the clearance space between the piston and the outer end of the cylinder or cylinder head. On account of the fresh charge having been introduced to the cylinder through the combustion chambers 7 from the inner ends thereof in which the spark plugs 16 are located, the most perfect part of the incoming charge will be adjacent said spark plugs or ignition means 16.

Figure 11:
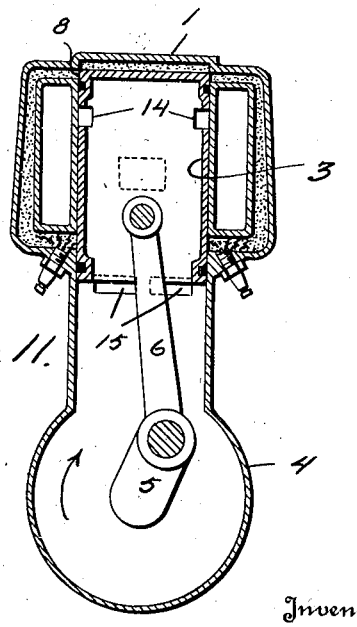

When the crank 5 has passed its outer dead center position, as clearly illustrated in Figure 11, the charge is ignited by means of the spark plugs or other ignition means 16 and the combustion thereof begins in the most highly combustible part thereof and spreads throughout the combustion chamber 7 with a high intensity of explosion or combustion, that is, with or without detonation, thereby resulting in high temperatures and pressures, completeness and efficiency of combustion with the minimum formation of carbon. While this explosion or combustion is occurring in the combustion chambers 7, the inlet ports 15 are open for receiving the fresh charge for the next power stroke, as has been previously described.

When the piston 3 starts downwardly on its power stroke from its uppermost position and uncovers ports 8, the high pressure products of combustion or explosion are admitted to the working cylinder in a very smooth, gradual and accelerated manner analogous to the admission of steam to the cylinder of a steam engine from the boiler thereof. The piston continues its downward motion, acted on by the working charge, and such a power stroke occurs every revolution or downward stroke, the products of combustion, after complete opening of the ports 8, expanding against the moving piston in the usual manner and passing through the explosion chambers and cylinder in one direction only, the piston finally uncovering the exhaust ports 11 to thereby release the spent products of combustion.

From the foregoing description of the construction and operation of preferred embodiments of my invention, it will be apparent that there are many advantages of combustion engines constructed in accordance therewith. For example the engine may be run in either direction upon starting in such a direction without modification of the mechanism illustrated without the aid of valves, cams, cam shafts, springs, gears, etc., the only moving parts being the piston assembly, connecting rod and crank shaft. Although a vertical type cylinder has been illustrated, the features of my invention may be used in connection with cylinders placed horizontal or in any desired position. By having a power stroke every revolution and having the charge consumed in combustion chambers separate from the working cylinder, a large amount of power for a given weight of engine and an elimination of carbon trouble is effected.

On account of the manner of operation with substantially no stress reversal on the reciprocating or rotating parts, the engine may continue to run without knocking after main, connecting rod and wrist pin bearings are badly worn. Comparative data at different speeds showing percent increase in power, torque and saving in fuel, using an engine according to my invention, compared with a conventional four-cycle engine of approximately the same size, the latter having been made by one of the foremost engine builders in the country, is as follows:

| Speed (R. P. M.) | Increase power | Increase torque | Less fuel |
|---|---|---|---|
|  | Per cent | Per cent | Per cent |
| 600 | 147 | 133 | 51 |
| 800 | 93 | 95 | 53 |
| 1000 | 75 | 85 | 51 |
| 1200 | 68 | 89 | 46 |
| 1400 | 60 | 102 | 44 |

Although I have described only two embodiments of my invention, it is obvious that the features thereof may be embodied in various modifications without departing from the spirit and scope of my invention, and it is thought that an engine of the aforedescribed construction will be admirably suited as an automobile or aeroplane engine especially as approximately double the power may be secured therefrom than from a conventional four-cycle engine of the same weight.

Having thus described the invention, I claim:

1. In a combustion engine, a cylinder with inlet and exhaust ports, a piston operable therein, a combustion chamber, ports connecting said chamber and cylinder and opened and closed by the piston moving in the cylinder, means igniting a charge in said chamber for combustion at constant volume, and means for subsequently admitting said ignited charge to the cylinder by movement of the piston to uncover a connecting port, said exhaust port being uncovered by the piston near the end of the power stroke.

2. In a combustion engine, a cylinder with inlet and exhaust ports, a piston working therein, a constant volume combustion chamber connected with said cylinder by ports, all of said ports being covered and uncovered by the piston, said chamber being charged with fuel by movement of the piston and completely closed from said cylinder when the piston is adjacent the outer end of its stroke, and means for igniting charges of fuel in said combustion chamber.

3. In a combustion engine, a cylinder with inlet and exhaust ports, a piston operating therein, a combustion chamber connected with said cylinder by spaced ports covered and uncovered by the piston for permitting explosive charges to pass into the cylinder through the combustion chamber, and, after covering one of said spaced ports, to be forced back to the combustion chamber, and, after explosion, to pass into the cylinder for the power stroke.

4. In a combustion engine, a cylinder with inlet and exhaust ports, a piston operating therein, a combustion chamber connected to said cylinder by spaced ports controlled by the piston and adapted to initially receive from the cylinder an explosive charge at one port and discharge it to the cylinder at another port, said other port then permitting compression of the charge in the combustion chamber upon movement of the piston, said combustion chamber being entirely cut off from communication with the cylinder when the piston is at one end of its stroke and the charge ignited.

5. In a combustion engine of the two cycle type, a cylinder with inlet and exhaust ports, a piston operating therein, a combustion chamber operatively connected to said cylinder by spaced piston controlled ports, one of said piston controlled ports being adjacent one end of the cylinder and the other spaced toward the other end of said cylinder, both ends of said cylinder being closed, said piston upon movement thereof, drawing an explosive charge into one end of said cylinder through said inlet port, slightly compressing it, forcing said charge into said combustion chamber through one piston controlled port, and into the other end of said cylinder through the other piston controlled port, compressing it in said other end of the cylinder and combustion chamber and finally closing off said combustion chamber from the cylinder, and means for firing the charge in said combustion chamber while closed off from the cylinder.

6. In a combustion engine of the two cycle type, a cylinder with inlet and exhaust ports, a piston operating therein, a combustion chamber operatively connected to said cylinder by spaced piston controlled ports, respectively disposed adjacent one end and intermediate the ends of said cylinder, the outer end of said cylinder being operatively imperforate, said piston upon movement drawing an explosive charge into the inlet port, slightly compressing it, forcing it into said combustion chamber through one of said spaced ports, and into the other end of said cylinder through the other spaced port, compressing said charge in said other end of the cylinder and combustion chamber and finally closing off said combustion chamber from the cylinder, and means for firing the charge in said combustion chamber while so closed off.

7. In a combustion engine, a cylinder with inlet and exhaust ports, a piston operating therein, a combustion chamber having piston controlled ports communicating with said cylinder adjacent one end and intermediate the ends of said cylinder, said piston forcing a charge of combustible fluid from the cylinder into the combustion chamber through the connection intermediate the ends of said cylinder and compressing said charge in said combustion chamber, and means for igniting said charge, said piston then permitting the release of the ignited charge from said combustion chamber in the same direction through the port adjacent one end of the cylinder.

8. In a combustion engine, a cylinder with inlet and exhaust ports, a piston operating therein, a combustion chamber having a piston controlled port communicating with said cylinder adjacent one end and another piston controlled port communicating therewith intermediate the ends of said cylinder, said piston forcing a charge of combustible fluid from the cylinder into the combustion chamber through the port at the intermediate portion of said cylinder and compressing said charge in said combustion chamber, means for igniting said charge, said piston then moving to uncover said piston controlled port adjacent one end of the cylinder to release the ignited charge from said combustion chamber in the same direction, and finally uncovering the exhaust port in said cylinder to allow free exhaust of the charge after explosion.

9. In a combustion engine, a cylinder with inlet and exhaust ports, a piston operating therein, a plurality of oppositely disposed combustion chambers outside of said cylinder, piston controlled ports connecting said chambers and cylinder and the ports from each chamber being spaced longitudinally of the cylinder, the outer of said ports being adjacent the outer end of the cylinder, and the inner of said ports being disposed intermediate the ends of said cylinder, said piston upon movement thereof forcing a charge of combustible fluid into said combustion chambers through the inner ports, compressing said charge therein, closing off said chambers from the cylinder, means for exploding said charge while said chambers are so closed off, said piston subsequently connecting said combustion chambers with said cylinder to allow the ignited charge to expand therefrom against the piston in the cylinder to effect the operation of the engine.

10. In a combustion engine, a cylinder with inlet and exhaust ports, a piston therein, a combustion chamber connected to said cylinder by spaced piston controlled ports, means for exploding a charge in said combustion chamber at constant volume while said combustion chamber is closed off from the cylinder by the piston, means for subsequently admitting said charge to the cylinder by movement of the piston to uncover a port so that said charge can expand from the combustion chamber in the cylinder, and means for finally exhausting the spent charge directly from the cylinder through the exhaust port to the atmosphere.

11. In a combustion engine, a cylinder with inlet and exhaust ports, a piston, a combustion chamber, spaced ports connecting said combustion chamber and cylinder and being opened and closed by movement of the piston, means for exploding a charge in said combustion chamber while the ports are closed by the piston, whereby heating occurs at constant volume, said piston subsequently uncovering one of said ports to release said charge to act thereagainst in said cylinder, and finally uncovering the exhaust port to permit the burnt charge to escape.

12. In a combustion engine, a cylinder with inlet and exhaust ports, a piston, a combustion chamber, two piston controlled ports connecting said cylinder and combustion chamber for transmitting combustible charges and disposed respectively adjacent one end and intermediate the ends of the cylinder, said ports being completely closed by the piston when the charge is ignited, whereby combustion occurs in the chamber at constant volume, said piston moving to admit the products of said constant volume combustion from said chamber through one of said ports into the cylinder behind the piston, to allow the charge to expand and finally uncovering the exhaust port to release the waste gases.

13. In a combustion engine, a cylinder with inlet and exhaust ports, a piston operating therein, a combustion chamber connected with said cylinder by longitudinally spaced ports and completely closed therefrom during portions of the cycle by the piston closing said ports, said piston charging said combustion chamber, means for igniting said charge when said chamber is closed off by the piston and said piston subsequently uncovering one of said ports for admitting the products of combustion into the cylinder for doing work every inward stroke of the piston and finally uncovering the exhaust port to permit escape of the waste gases.

14. In a combustion engine, a cylinder, a piston therein, a combustion chamber communicating with the cylinder by spaced ports closed directly by the piston at the outer limit of its travel, said combustion chamber being supplied with combustible fluid by pumping action of the piston through both ports, and ignition means located within said combustion chamber.

15. In a combustion engine, a cylinder, a piston operating therein, a combustion chamber, a pair of ports connecting said chamber and cylinder and closed by the piston when in its outermost position, said piston serving to force combustible fluid into said chamber through one of said ports and into said cylinder, compress it into and release it after combustion from the other port, and ignition means located within said combustion chamber adjacent the inner portion thereof.

16. In a combustion engine, a cylinder, a piston operating therein, a combustion chamber extending lengthwise with the cylinder and provided with outer and inner ports communicating with said cylinder, said piston closing off both ports when at the outer end of its stroke, said piston compressing combustible fluid in the inner end of said cylinder, forcing it through the ports into the cylinder, and subsequently forcing said fluid from the cylinder, through the outer port to the combustion chamber for ignition therein.

17. In a combustion engine, a cylinder, a piston therein, a plurality of oppositely disposed combustion chambers extending lengthwise of the cylinder and each provided with outer and inner ports communicating with said cylinder, said ports being covered and uncovered directly by the piston moving in the cylinder, said chambers being supplied with combustible fluid through all ports through pumping action of the piston and ignition means located in said combustion chambers.

18. In a combustion engine, a cylinder, a piston operating therein, a combustion chamber extending lengthwise with respect to the cylinder and provided with outer and inner ports connecting said chamber and cylinder, said ports being covered and uncovered by the piston upon movement thereof, said chamber being charged with combustible fluid through its ports by the pumping effect of the moving piston, and ignition means located adjacent the inner port of said combustion chamber.

19. In a combustion engine, a cylinder, a piston therein, a combustion chamber extending lengthwise with respect to the cylinder, and having upper and lower ports opening thereinto, for receiving a combustible charge from the cylinder, first through the lower and then through the upper port, and after explosion, admitting it to said cylinder through said upper port, said upper port being closed directly by the piston when in its uppermost position, and ignition means located adjacent the lower port and operated when said upper port is closed.

20. In a combustion engine, a cylinder, a piston therein, a combustion chamber formed relatively wide and thin extending lengthwise of the cylinder and communicating therewith at outer and intermediate portions thereof, said chamber being supplied with explosive charges through its communication with the cylinder by the pumping action of the piston, the ports connecting the ends of said chamber with said cylinder being closed by the piston when at its outer limit of movement for the combustion of fuel in said chamber.

21. In a combustion engine, a cylinder, a piston operating therein, a combustion chamber, longitudinally spaced ports connecting said chamber and cylinder, both of said ports being closed by said piston when at the outer end of its stroke, and each open to a different part of the cylinder partitioned by the piston at the inner end of said stroke, said piston being formed with cooling fins on its inner surface, and a baffle plate to force combustible charges to sweep against said fins to cool the piston while heating said charges prior to entry of the same into the combustion chamber.

22. In a combustion engine, a cylinder, a piston operating therein, a combustion chamber extending lengthwise of said cylinder with opposite ends directly connected thereto by curved end portions, said piston operating to feed fuel to the combustion chamber during each reciprocation, the cylinder walls and the adjacent side only of said combustion chamber being provided with artificial cooling means, whereby the convex side of said combustion chamber is normally maintained relatively hot for vaporizing incoming fuel particles to a desired degree.

23. In a combustion engine, a cylinder, a piston operating therein, a combustion chamber extending lengthwise of said cylinder with opposite ends connected thereto by curved end portions, said piston acting to feed fuel to the combustion chamber, the cylinder walls and the adjacent side only of said combustion chamber being provided with artificial cooling means, whereby the convex side of said chamber is normally maintained relatively hot for vaporizing incoming fuel particles to a desired degree, and means provided on the piston for forcing said incoming fuel to sweep against the inner surface of the piston prior to entering said combustion chamber.

24. In a combustion engine, a cylinder, a piston therein, a combustion chamber independent of the cylinder and communicating with outer and intermediate portions thereof, said piston being formed to force fuel into said combustion chamber and cover and uncover the communicating ports between the combustion chamber and cylinder as required.

25. In a combustion engine, a cylinder, a piston operating therein, a plurality of oppositely disposed combustion chambers independent of the cylinder, and connected thereto by ports adjacent outer and intermediate parts of said cylinder, said ports being positioned so as to be covered by the piston at the outer limit of its travel and uncovered in other positions for the admission of fuel to, and discharge of burnt gases from said chamber.

In testimony whereof I affix my signature.

PALMER ST. CLAIR, Jr.